United States Patent
Berndt et al.

(10) Patent No.: US 7,916,630 B2
(45) Date of Patent: Mar. 29, 2011

(54) MONITORING CONDITION OF NETWORK WITH DISTRIBUTED COMPONENTS

(75) Inventors: Stefan Berndt, Bönen (DE); Thomas Hanna, Detmold (DE); Thorsten Laux, Paderborn (DE); Steffen Rusitschka, München (DE); Christian Scheering, Bielefeld (DE); Alan Southall, München (DE)

(73) Assignee: Siemens Aktiengesellschaft, Munich (DE)

( * ) Notice: Subject to any disclaimer, the term of this patent is extended or adjusted under 35 U.S.C. 154(b) by 531 days.

(21) Appl. No.: 11/662,978

(22) PCT Filed: Jun. 17, 2005

(86) PCT No.: PCT/EP2005/052828
§ 371 (c)(1),
(2), (4) Date: Jan. 18, 2008

(87) PCT Pub. No.: WO2006/029914
PCT Pub. Date: Mar. 23, 2006

(65) Prior Publication Data
US 2008/0261521 A1 Oct. 23, 2008

(30) Foreign Application Priority Data
Sep. 16, 2004 (DE) .......... 10 2004 044 987

(51) Int. Cl.
*G01R 31/08* (2006.01)
(52) U.S. Cl. .......... 370/222; 370/248; 370/242
(58) Field of Classification Search .......... None
See application file for complete search history.

(56) References Cited

U.S. PATENT DOCUMENTS

| | | | |
|---|---|---|---|
| 6,574,197 B1 | 6/2003 | Kanamaru et al. | |
| 2002/0169861 A1* | 11/2002 | Chang et al. | 709/223 |
| 2003/0179742 A1 | 9/2003 | Ogier et al. | |
| 2003/0204786 A1 | 10/2003 | Dinker et al. | |
| 2008/0037562 A1* | 2/2008 | Saleh et al. | 370/400 |

FOREIGN PATENT DOCUMENTS

| | | |
|---|---|---|
| DE | 199 00 065 B4 | 2/2004 |
| JP | 4-84533 | 3/1992 |
| JP | 5-56061 | 3/1993 |
| JP | 5-102993 | 4/1993 |

OTHER PUBLICATIONS

S. Fakhouri et al.; "GulfStream—A System for Dynamic Topology Management in Multi-Domain Server Farms", Proceedings of the 3rd IEEE International Conference on Cluster Computing; 2001; pp. 55-62.
A. Tripathi et al.; "Reliable Management of Distributed Computations in Nexus", Proceedings of the 2nd IEEE International Symposium on High Performance Distributed Computing; 1993, pp. 298-305.
F. Jahanian et al.; "Processor Group Membership Protocols: Specification, Design and Implementation"; Proceedings of the 12th Symposium on Reliable Distributed Systems; 1993; pp. 2-11.
International Search Report for International Application No. PCT/EP2005/052828; mailed Feb. 23, 2006.

* cited by examiner

*Primary Examiner* — Duc C Ho
(74) *Attorney, Agent, or Firm* — Staas & Halsey LLP

(57) ABSTRACT

In a system having distributed components arranged in a logical ring structure, each component monitors only their respective neighboring component in the structure and the condition of the neighboring component is determined. If a component determines a condition of its neighboring component that corresponds to a predefinable condition, the component informs the other components of the system of the predefined condition of the neighboring component.

15 Claims, 2 Drawing Sheets

MONITORING CONDITION OF NETWORK WITH DISTRIBUTED COMPONENTS

CROSS REFERENCE TO RELATED APPLICATIONS

This application is based on and hereby claims priority to German Application No. 10 2004 044 987.2 filed on Sep. 16, 2004, the contents of which are hereby incorporated by reference.

BACKGROUND

The application relates to the monitoring and/or checking, generally referred to as monitoring for short in the following, of a system condition of a system with distributed components.

In such systems—known as distributed systems for short—such as for example mobile or stationary radio and/or communication networks, there is as a rule a requirement for all the components of the distributed system to have a knowledge of the status or condition of every other component in the system (monitoring).

If for example a component in a distributed system fails, for example as a result of the fact that a component is or becomes inoperative and/or offline, then it is advantageous for every other component in the system to receive this information.

Different approaches in which the monitoring is implemented by a so-called Ping-Pong mechanism using so-called Ping-Pong messages are known from the related art for monitoring a system condition of a distributed system.

In this situation, in other words in the case of such a mechanism based on Ping-Pong messages, a system component periodically sends a Ping message over the distributed system to a component being monitored, to which the component being monitored responds with a Pong response, a so-called Pong Acknowledgment.

If there is no Pong response from a component being monitored, then this component will be classified, by the component sending the Ping message as a rule, as offline or generally as inoperative.

In order to enable a component of a distributed system to ascertain or check the status or condition of every other component of the distributed system, it queries all the components using the Ping-Pong mechanism.

A known (first) approach here for monitoring a system condition of a distributed system, based on the Ping-Pong mechanism, makes provision whereby each component of a distributed system monitors every other component of this system and for this purpose queries corresponding information concerning the status or the condition of the other components in each case.

To this end, each component of the distributed system sends every other component of the system a Ping message—and receives (back) corresponding Pong responses when the other components in question are in an operative or online condition.

FIG. 3 illustrates this known first approach. A distributed communication system 300, a HiPath IP telephony system 300, with a plurality of communication servers 301 to 306 associated in a communication network is thus represented in FIG. 3. Each of these communication servers 301 to 306 needs to know about the failure of any other communication server 301 to 306 in the system 300. To this end, each of these communication servers 301 to 306 now sends a Ping message 310 to each of the other communication servers 301 to 306 in the HiPath IP telephony system 300—and receives corresponding Pong responses 311 when the other communication servers 301 to 306 in question are in an operative or online condition.

The disadvantage of this known first approach is the fact that a high message volume is generated here of an order $O(n^2)$ (n: number of system components) during monitoring of a system condition of a distributed system, which may restrict the power or capacity and/or the error detection capability/speed of the system.

Thus, for example, in the case of the HiPath IP telephony system 300 according to FIG. 3, Ping-Pong messages (310, 311) are sent every 60 seconds. In this situation, in the case represented with the 6 communication servers 301 to 306, or alternatively 30 servers, (6*5*2)/60 s=1 message per second or (30*29*2)/60 s=29 messages per second respectively are produced.

With regard to a further known approach for monitoring a system condition of a distributed system, based on the Ping-Pong mechanism, provision is made here whereby a central coordinator checks components of a distributed system, registers inoperative components or failed components of the distributed system and propagates corresponding information to all the components in the system.

The message volume generated here is of the order $O(n)$.

The disadvantage of this further known approach is the fact that it can only be implemented robustly with difficulty because the central coordinator of the distributed system must be maintained in redundant form.

SUMMARY

An aspect is to set down a method which simplifies monitoring of a system condition of a distributed system and/or implements or enables this with a reduced resource requirement.

With regard to the method for monitoring a system condition of a system with distributed components, the distributed components of the system are or will be organized in a logical ring structure.

In this situation, a "logical" ring structure (of system components) means that without restricting the generality no physical concrete structuring of the system components into a ring structure takes place as a rule but that these are organized or structured in this manner conceptually, in other words as a conceptual model, in a virtual ring structure.

Each component of the system monitors only its respective neighboring component in the logical ring structure, whereby a condition of the neighboring component is determined.

If a component determines a condition of its neighboring component, which condition corresponds to a predefinable condition, then it informs the other components of the system about the determined, predefined condition of its neighboring component.

One advantage of the method is the fact that it combines advantages of the approaches described above, known from the related art.

Only messages of the order $O(n)$ are required in order to monitor the status or the condition of all the (distributed) components in the distributed system. In this situation, there is however no central entity, the central coordinator, which needs to be maintained robustly.

The approach is thus clearly based on a logical ring structure in which the components of the distributed system are or will be organized.

In this case, each component of the system monitors only its respective neighbor, in other words its respective neighboring component, in the ring. In the event of failure, as in the case of an inoperative and/or offline condition, of the neighbor the component informs all the other components about this.

With regard to the network with distributed components, the distributed components are organized in a logical ring structure. The components organized in the ring structure are set up such that a component only monitors its respective neighboring component in the logical ring structure, whereby a condition of the respective neighboring component can be determined, and a component which has determined a condition of its neighboring component, which condition corresponds to a predefinable condition, informs the other components of the system about the determined, predefined condition of its neighboring component.

Computer program code elements may be stored on a machine-readable medium set up to perform all the steps according to the method when the program is executed on a computer.

The setup and also the computer program with program code elements, set up to perform all the steps according to the method when the program is executed on a computer, and also the computer program product with program code elements stored on a machine-readable medium, set up to perform all the steps according to the method when the program is executed on a computer, are in particular suitable for performing the method or one of its developments described in the following. The developments described in the following relate both to the methods and also to the network.

The method described in the following can be implemented both in software and also in hardware, by using a special electrical circuit for example.

In addition, it is also possible to implement the method described in the following by a computer-readable storage medium on which is stored a computer program with program code elements that a processor executes.

In a development, provision is made whereby the predefinable condition is a functional incapacity, in particular an offline condition, or a functional capacity, in particular an online condition. The term "alive" has become widely accepted among experts for the functional capacity.

The monitoring of the respective neighboring component and/or the determination of the condition of a component can preferably be carried out using a method based on a leasing method.

In this situation, in other words with regard to a leasing method, "Alive" information, particularly an "Alive" message, can be sent or is sent from the neighboring component to the component.

It can be advantageous here, particularly in respect of current information about a system condition, to send the "Alive" information periodically.

On the basis of such "Alive" information, which may be periodic but is not necessarily so, it is then possible to determine a functional incapacity of the neighboring component if the neighboring component does not send (no longer sends) "Alive" information. This can clearly mean that—on the other hand—as long as "Alive" information is being sent, an "online" condition can be assumed for the respective component.

In addition, it is advantageous for the process of informing the other components about the predefinable condition of a neighboring component to be carried out using a method based on an "Inform All" method.

Here, in other words with regard to the method based on an "Inform All" method applied, an acknowledgment process is performed for each other component in the system, in which the respective other component, if it has received the information about the predefinable condition of a neighboring component, confirms the receipt of the information, in particular by using "Acknowledgment" information, specifically an "Acknowledgment" message. The term "acknowledgment" has become widely accepted among experts for the "confirmation".

In this situation, the acknowledgment (of receipt of the information) occurs as a rule with respect to the component which has determined the predefinable condition of the neighboring component, in particular by the fact that an "Acknowledgment" message is sent to the component.

In addition, provision can be made whereby the predefinable condition is also determined for another component which does not acknowledge the receipt of the information about the determined, defined condition of the neighboring component.

In this case too, all the other components can again be informed about this information. This can be done with or also without a corresponding acknowledgment procedure.

In a further embodiment, provision is made whereby each component stores information about the conditions of the other components, particularly in a local list. As a result, each component (always) has local knowledge about a global status or condition of the distributed system.

By using this knowledge, it is then possible to specifically send "leasing" messages and/or to maintain the ring structure in a "closed" condition.

In addition, the neighboring component to a component in the ring structure can be a predecessor or also a successor in the logical ring structure.

In a further embodiment, provision is made for monitoring a communication network, in particular a stationary communication network, such as a fixed telephone network for example, with distributed components. In this case the components are as a rule communication servers.

The monitoring can however also be performed accordingly in the case of mobile, distributed systems, such as mobile radio networks.

BRIEF DESCRIPTION OF THE DRAWINGS

These and other objects and advantages will become more apparent and more readily appreciated from the following description of the preferred embodiments, taken in conjunction with the accompanying drawings of which.

DETAILED DESCRIPTION OF THE PREFERRED EMBODIMENTS

Figure 1:
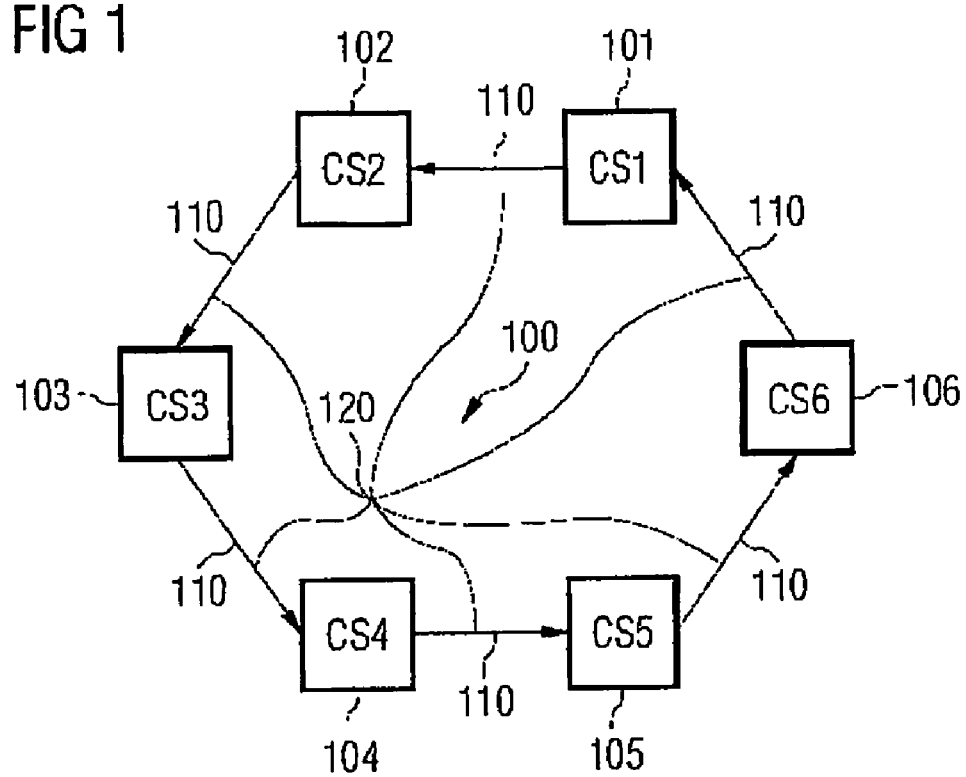
FIG. 1 shows a distributed system with (distributed) components organized in a logical ring structure, in which each component only monitors its respective neighbor in the ring, according to an exemplary embodiment.

Reference will now be made in detail to the preferred embodiments, examples of which are illustrated in the accompanying drawings, wherein like reference numerals refer to like elements throughout.

Figure 2:
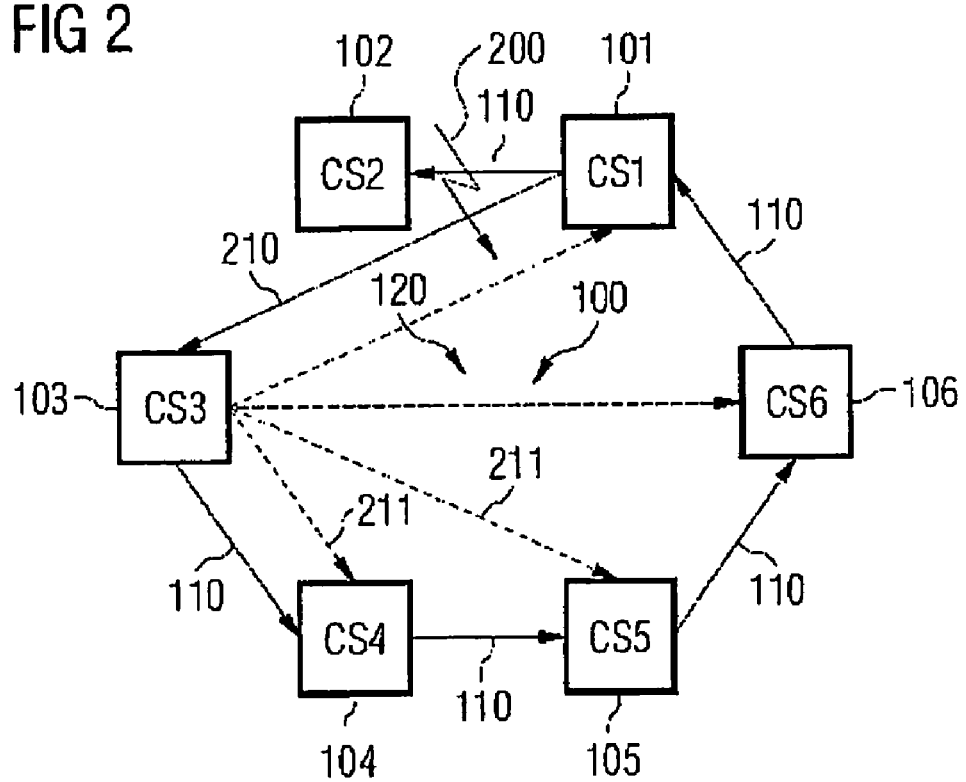
FIG. 2 shows a distributed system with (distributed) components organized in a logical ring structure, in which each component only monitors its respective neighbor in the ring, where one component has failed, according to an exemplary embodiment.

FIG. 1 and FIG. 2 show a distributed communication system 100, a HiPath IP telephony system 100 further developed as described herein, with a plurality of communication servers 101 to 106, associated in a communication network, also referred to as "components" 101 to 106 for short in the following.

Each of these communication servers 101 to 106 needs to know about a failure (cf. FIG. 2) of any other communication server 101 to 106 in the system 100, this facility being implemented by the monitoring mechanism described in the following.

To this end, the communication servers 101 to 106 of the HiPath IP telephony system 100 further developed as described herein are organized in a logical ring structure 120 (102 follows 103, 101 follows 102, 106 follows 101, 105 follows 106, 104 follows 105, 103 follows 104).

Here, each communication server 101 to 106 then monitors 110 only its respective successor in the ring structure 120 (102 monitors successor 101; 103 monitors successor 102; ...).

In the event of failure 200 of a successor (cf. FIG. 2, 102 in the event of failure 200), the respective (preceding in the ring 120) communication server (cf. FIG. 2, 103) informs all the other communication servers about this (cf. FIG. 2, 211).

The monitoring 110 of a successor server 101 to 106 in the ring structure 120 takes place here, in other words in the case of the HiPath IP telephony system 100 further developed as described herein, by way of a "leasing" method.

In this situation, a successor, component 102 for example, periodically sends a so-called "Alive" message 110 to the respective preceding communication server in the ring, component 103 according to the example.

If in the case of one communication server (103 in FIG. 2) this "Alive" message 110 from its successor (102 in FIG. 2) is absent (the "lease" expires), the successor (102 in FIG. 2) will be categorized as "offline".

The communication server 103 monitoring this "offline" communication server 102 then informs every other communication server 101, 104 to 106 in the system 100 about this by corresponding information messages 211, in other words about the failure 200 of its successor 102.

Every other communication server 101, 104 to 106 in the system 100 must confirm the receipt of the information by an "Acknowledgment" message.

If this acknowledgment is missing from one of the other components 101, 104 to 106, then this communication server will also be categorized as "offline".

All the communication servers are in turn informed about this further failure by the communication server 103.

At this stage the communication server 103 does not however expect any further acknowledgment.

This mechanism is referred to as "Inform All".

Each component 101 to 106 stores its knowledge of the status of other components 101 to 106 in the system 100 in a local list. As a result, each component 101 to 106 always has a local knowledge of the global status of the system 100.

With the aid of this knowledge, each component 101 to 106 sends a "Lease" message to the next "online" predecessor known to it. This guarantees that the ring 120 is always in a closed condition.

At the same time, each component 101 to 106 sends a "Lease" message to all "offline" predecessors which are situated in the ring between the next known "online" predecessor and the component itself.

This method guarantees that components 101 to 106 which come "online" again are re-integrated into the ring 120.

If one component 101 to 106 recognizes from receiving a Lease message that another component is "online" again, then it informs all the other components 101 to 106 using the "Inform All" mechanism.

Figure 3:
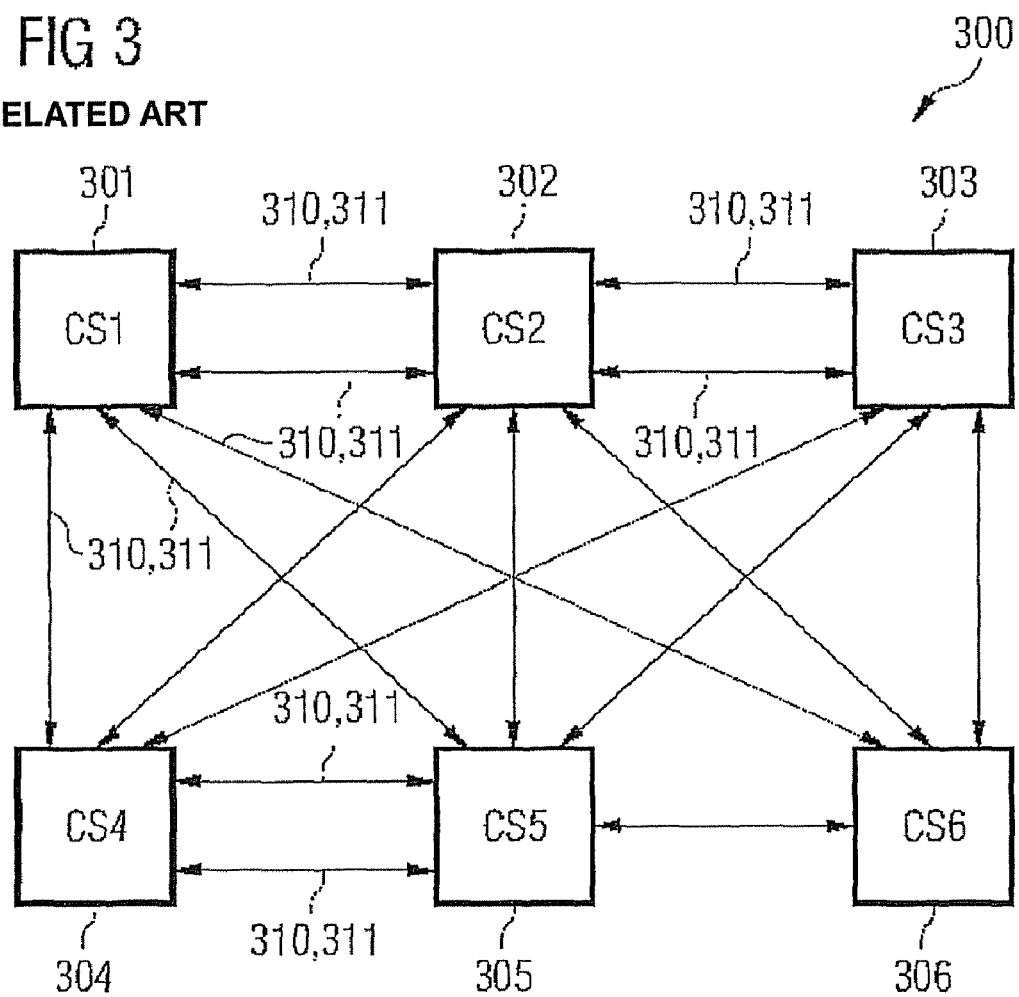
FIG. 3 shows a distributed system with (distributed) components, in which each component monitors every other component of the system, according to the related art.

If account is taken of the fact that in the case of the above system known from the related art and its monitoring mechanism (cf. FIG. 3) 29 messages per second were necessary or were sent, then according to the embodiment—given the same number of messages per second—a monitoring operation can occur at approximately once per second (30/29 messages per second).

As a result, a system with 30 servers can under the same network load be monitored 60 times more quickly and recognize an error. The more servers a system contains, the better this factor becomes.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 04).

The invention claimed is:

1. A method for monitoring a system condition of a network with distributed components organized in a logical ring structure, comprising:

each component in the system monitoring only a single respective neighboring component among said distributed components that is a predecessor or successor of said each component in the logical ring structure to determine a current condition of the respective neighboring component; and each component in the system informing all other components of the system about the current condition of the respective neighboring component when the current condition corresponds to at least one predefined condition.

2. The method as claimed in claim 1, wherein the at least one predefined condition is at least one of a functional incapacity corresponding to an offline condition and a functional capacity corresponding to an online condition.

3. The method as claimed in claim 2, wherein at least one of said monitoring of the respective neighboring component and determination of the current condition of the respective neighboring component is carried out based on a leasing method.

4. The method as claimed in claim 3, wherein with regard to the leasing method, an "Alive" message is sent from the respective neighboring component.

5. The method as claimed in claim 4, wherein the "Alive" information is sent periodically.

6. The method as claimed in claim 5, wherein the functional incapacity of the neighboring component is determined if the respective neighboring component does not send any "Alive" information for a predetermined period of time.

7. The method as claimed in claim 6, wherein said informing all the other components about the predefined condition of the respective neighboring component is carried out using an "Inform All" method.

8. The method as claimed in claim 7, further comprising, with regard to the "Inform All" method, performing an acknowledgment process by each of the other components, in which each of the other components, if it has received information about the predefined condition of the respective neighboring component, confirms receipt of the information, by sending an "Acknowledgment" message.

9. The method as claimed in claim 8, wherein the "Acknowledgment" message is sent to the component which has determined the predefined condition of the respective neighboring component.

10. The method as claimed in claim 9, further comprising determining the predefined condition for any component which does not acknowledge the receipt of the information about the predefined condition of the respective neighboring component.

11. The method as claimed in claim 10, further comprising in each component storing a local list of conditions of the other components.

12. The method as claimed in claim 11, wherein the respective neighboring component is one of a predecessor component and a successor component in the logical ring structure.

13. The method as claimed in claim 12, wherein the network is one of a stationary communication network and a telephone network and the components are communication servers.

14. At least one non-transitory computer-readable medium encoded with at least one computer program that when executed by at least one processor performs a method comprising:

each component in a logical ring structure monitoring only a single neighboring component among distributed components that is a predecessor or successor of said each component in the logical ring structure to determine a current condition of the neighboring component; and each component in the logical ring structure informing all other components of the system about the current condition of the neighboring component when the current condition corresponds to a predefined condition.

15. A network with distributed components, comprising:

components organized in a logical ring structure, each component monitoring only a single respective neighboring component among components that is a predecessor or successor of said each component in the logical ring structure to determine a current condition of the respective neighboring component and informing all other components of said network when the current condition of the respective neighboring component corresponds to a predefined condition.

* * * * *